(12) United States Patent
Wigren et al.

(10) Patent No.: US 11,848,732 B2
(45) Date of Patent: Dec. 19, 2023

(54) STEERING VECTOR WEIGHTING FOR ZF BACKHAUL TRANSMISSION

(71) Applicant: Telefonaktiebolaget LM Ericsson (publ), Stockholm (SE)

(72) Inventors: Torbjörn Wigren, Uppsala (SE); Ari Kangas, Lidingö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 443 days.

(21) Appl. No.: 17/279,681

(22) PCT Filed: Sep. 27, 2018

(86) PCT No.: PCT/SE2018/050988
§ 371 (c)(1),
(2) Date: Mar. 25, 2021

(87) PCT Pub. No.: WO2020/067940
PCT Pub. Date: Apr. 2, 2020

(65) Prior Publication Data
US 2022/0038149 A1 Feb. 3, 2022

(51) Int. Cl.
*H04B 7/06* (2006.01)
*H04W 88/14* (2009.01)
(52) U.S. Cl.
CPC ......... *H04B 7/0617* (2013.01); *H04B 7/0634* (2013.01); *H04W 88/14* (2013.01)
(58) Field of Classification Search
CPC .. H04B 7/0617; H04B 7/0634; H04B 7/0465; H04B 7/0408; H04W 88/14; H04L 5/0025; H04L 5/0048; H04L 25/0204
See application file for complete search history.

(56) References Cited

U.S. PATENT DOCUMENTS 9,735,940 B1 * 8/2017 Bakr .................. H04W 4/06
2009/0289864 A1 11/2009 Derneryd et al.
(Continued)

FOREIGN PATENT DOCUMENTS

CN 106059972 A 10/2016
WO 2016/165767 A1 10/2016

OTHER PUBLICATIONS

International Search Report and Written Opinion issued in International Application No. PCT/SE2018/050988 dated May 16, 2019 (13 pages).
(Continued)

*Primary Examiner* — Wutchung Chu
(74) *Attorney, Agent, or Firm* — Rothwell, Figg, Ernst & Manbeck, P.C.

(57) ABSTRACT

A method for wireless backhaul inter-node communication between a first backhaul node and a second backhaul node is provided. The method includes computing a beamforming weight matrix W; and the first backhaul node using the beamforming weight matrix W to transmit and/or receive data to and/or from the second backhaul node. The beamforming matrix W is computed as the inverse of a weighted channel estimate matrix (Formula I), such that W=(Formula II), where $\hat{H}$ is a channel estimate matrix and $\rho$ is a weighting factor matrix such that (Formula III) where $\rho$ has dimension $N_{rx}$ by $N_{tx}$, where $N_{rx}$ is the number of receive antennas and $N_{tx}$ is the number of transmit antennas, where $N_{tx}=N_{rx}$, and $\rho$ is a scalar between 0 and 1, and where ∘ denotes a Hadamard matrix product.

7 Claims, 11 Drawing Sheets

(56) References Cited

U.S. PATENT DOCUMENTS

| | | | |
|---|---|---|---|
| 2014/0187276 A1 | 7/2014 | Cyzs et al. | |
| 2017/0187426 A1* | 6/2017 | Su | H04B 1/3822 |
| 2018/0092099 A1 | 3/2018 | Ishiguro et al. | |
| 2019/0199410 A1* | 6/2019 | Zhao | H04B 7/0413 |
| 2019/0393948 A1* | 12/2019 | Zhao | H04B 7/0619 |
| 2020/0322953 A1* | 10/2020 | Hunukumbure | H04W 72/0453 |

OTHER PUBLICATIONS

He, Yuan Yuan et al, "Sum Rate Maximization for Cognitive MISO Broadcast Channels: Beamforming Design and Large Systems Analysis", IEEE Transactions on Wireless Communications, vol. 13, No. 5, May 1, 2014 (May 1, 2014), (pp. 2383-2401), XP011548058.

* cited by examiner

STEERING VECTOR WEIGHTING FOR ZF BACKHAUL TRANSMISSION

CROSS REFERENCE TO RELATED APPLICATION(S)

This application is a 35 U.S.C. § 371 National Stage of International Patent Application No. PCT/SE2018/050988, filed Sep. 27, 2018.

TECHNICAL FIELD

Disclosed are embodiments related to backhaul transmission.

BACKGROUND

In the emerging 5G cellular systems, beamforming and MIMO transmission will be central technologies. The reason is that spectral resources are running out at low carrier frequencies, which leads to a gradual migration into higher frequency bands, like the millimeter wave (mmw) bands. At such mmw bands, beamforming and use of massive antenna arrays are needed to achieve a sufficient coverage. There is, for example, plenty of available spectrum around 28 GHz and 39 GHz in the US and other markets. This spectrum needs to be exploited to meet the increasing capacity requirements. The 5G frequency migration is expected to start at 3.5-5 GHz, and then continue to these 28 GHz and 39 GHz bands that are expected to become available relatively soon.

Beamforming and MIMO transmission is a mature subject today. To explain the beamforming concept, consider FIG. 1, which shows an idealized one-dimensional beamforming case. As shown, system 100 incudes a UE 102 with a receive antenna array and a base station 104 with a transmit antenna array. If it is assumed that the UE is located far away from the antenna array, then it follows that the difference in travel distance from the base station to the UE, between adjacent antenna elements, is $$l = k\lambda \sin(\theta),$$

where $k\lambda$ is the antenna element separation. Here k is the separation factor which may be 0.5-0.7 in a typical correlated antenna element arrangement.

This means that a reference signal $s_i e^{j\omega t}$ (t transmitted from the i:th antenna element will arrive at the UE antenna as a weighted sum $$s_{UE} = \sum_{i=0}^{N-1} s_i h_i e^{j\omega\left(t - \frac{il}{c}\right)} = e^{j\omega t} \sum_{i=0}^{N-1} s_i h_i e^{-j\frac{\omega i k \lambda \sin(\theta)}{f_c \lambda}} = e^{j\omega t} \sum_{i=0}^{N-1} s_i h_i e^{-2\pi i j k \sin(\theta)}$$

Here $\omega$ is the angular carrier frequency, $h_i$ is the complex channel from the i:th antenna element, t is the time, and $f_c$ is the carrier frequency. In the above equation $\theta$ and $h_i$ are unknown. In case of a feedback solution, the UE therefore needs to search for all complex channel coefficients $h_i$ and the unknown angle $\theta$.

For this reason, the standard defines a codebook of beams in different directions, given by steering vector coefficients like $$w_{m,i} = e^{-jf(m,i)}$$

where m indicates a directional codebook entry. The UE then tests each codebook and estimates the channel coefficients. The information rate achieved for each codebook entry m is computed and the best one defines the direction and channel coefficients. This is possible since $s_i$ is known.

The result is encoded and reported back to the base station. This provides the base station with a best direction (codebook entry) and information that allows it to build up a channel matrix H. This matrix represents the channel from each of the transmit antenna elements to each of the receive antenna elements. Typically, each element of H is represented by a complex number.

The channel matrix can then be used for beamforming computations, or the direction represented by the reported codebook entry can be used directly. In case of MIMO transmission, the MIMO beamforming weight matrix W needs to be determined so that a best match according to a criterion is met. For zero-forcing (ZF) transmission, the criterion is focused on the equation WH=I. This expresses the fact that the weighting is supposed to make the transmitted data streams orthogonal at the receiver.

Channel reciprocity is a consequence of Maxwell's Equations. Given two nodes equipped with antenna arrays that communicate in a single frequency band, the channel reciprocity property means that at any given point in time, the complex channel coefficient between any transmitting antenna element in one node and any receiving antenna element in the other node, is the same (to within a transpose) in the uplink and the downlink. The channel matrix hence remains essentially the same between the antenna arrays of the two nodes when the direction of the transmission is reversed. The two nodes may typically be a UE and an eNB (or gNB in 5G), however in embodiments discussed below the two nodes are typically two or more gNBs (e.g. using 5G mmw bands). The time is assumed to be essentially the same for the two directions of transmission.

To exploit reciprocity, the channel coefficients can be directly estimated by the base station from UE uplink transmission of known pilot signals. The estimated channel can then be used to compute the combining weight matrix with a selected principle, and then used for downlink transmission. This works since the uplink and downlink channels are the same (to within a conjugate transpose) when reciprocity is valid.

SUMMARY

One feature that will be needed in 5G is the provision of indoor inter-node backhaul, i.e. to use a part of the 5G mmw spectrum for inter-node communication. Such communication is needed to avoid fiber data cabling to all nodes which can become both troublesome and expensive. Secondly, transmission schemes that make use of coordinated transmission from multiple sites to a single UE need the ability to divide data between them; and then a radio transmission can be made without additional hardware such as an additional fiber cable. Thirdly the radio base stations of 5G will incorporate functionality to automatically find neighboring base stations, e.g. by using directional beam space scanning. This means that plug-and-play type self-organizing network deployment becomes possible. Finally, interfering UEs can be nulled out, reducing the interference sensitivity. However, there is a need for transmission schemes that fit into the backhaul framework, and that are robust to various problems, such as those identified below.

Embodiments provide improved ways to exploit the above beamforming opportunities. In such beamforming scenarios, a major problem is caused by phase noise that affects the spatial multidimensional channel. The particular problem can be explained as follows. When antenna arrays with many elements are used to enhance coverage and capacity, the transmission zeros that arise in the spatial domain become more narrow meaning that the angular extension of a high gain beam or low gain zero becomes smaller. The phase noise affecting the angular channel estimation accuracy, however, remains essentially the same. The effect is an increase of the sensitivity to phase noise, with increasing antenna array size. This means that advanced transmission schemes that apply null-forming to reduce interference in e.g. multi-user MIMO transmission may fail where the phase noise becomes too high, as compared to the antenna array size and the applied transmission scheme. A secondary consequence is then a reduced coverage and capacity of the system. It is hence of great interest to mitigate these effects, e.g. by making the above transmission schemes less aggressive and thereby more stable.

Embodiments provide systems and methods suitable to smooth the antenna array beam pattern, thereby making the estimated channel quality in different directions more stable. To allow a reuse of the existing zero forcing transmission scheme, embodiments provide for modifications to the quantities upon which the transmission scheme is based, typically the so-called steering vectors. A further objective is to obtain modifications that can be implemented with a low computational complexity.

For in-band backhaul using ZF transmission, one case of interest is where the number of transmitting antenna elements on the transmitting node and the number of receiving antenna elements on the receiving node are the same. This means that the channel matrix H is square. In this case, the criterion WH=I may be solved for the beamforming weights W by taking the inverse. That is, the beamforming weights W may then be obtained from the quadratic channel matrix H as $$W=H^{-1}.$$

This makes the received data streams orthogonal in theory.

In more complicated cases, it is possible to handle non-square H and W. This requires additional complexity, since H is not directly invertible. However, constraint WH=I may be approximated by optimization techniques.

One problem associated with the basic ZF transmission scheme originates from the fact that the interfering transmission to one user onto another user is handled by null-forming in the estimated directions of interfered users. To illustrate the problem, consider a scenario with one gNB and two UEs, with two TX antennas in the gNB and one RX antenna per UE. Beam patterns like what is shown in FIGS. 2A and 2B then results in case of perfect channel knowledge. FIG. 2A illustrates SINR (in dB units) as a function of the angle (in radians), where the receiving UE is at −0.1 rad and the interfered UE is at 0.7 rad; FIG. 2B illustrates the same, where the receiving UE is at 0.7 rad and the interfered UE is at −0.1 rad.

As can be seen in the figures, sharp nulls (or zeroes) are placed at the directions of the "other" UE to minimize cross-talking interference. However, this strategy is known to be non-robust in the presence of channel estimation errors due to e.g. phase noise. The consequence is that U-IMNO performance may deteriorate to an unacceptable level. To illustrate this fact, a phase noise of 5 degrees, 1-sigma, was added to the scenario. This is the phase noise level used in current LTE AAS simulations. The effect is shown in FIGS. 3A and 3B. FIG. 3A illustrates SINR (in dB units) as a function of angle (radians), showing a phase noise of five degrees, 1-sigma, where the receiving UE is at −0.1 rad and the interfered UE is at 0.7 rad. FIG. 3B illustrates the same, where the receiving UE is at 0.7 rad and the interfered UE is at −0.1 rad. As can be seen, the null-forming breaks down completely, with variations and SINR losses exceeding 40 dBs. Embodiments of the invention are aimed to addressing this sensitivity to phase noise.

Embodiments provide for a configuration for an in-band backhaul ZF transmission scheme, that is consistent with deployment of base stations (gNBs) in a typically indoor environment. Embodiments also provide a more robust ZF transmission scheme, such that the sharp and narrow nulls are replaced by more smooth ones. Embodiments also have the advantage of having low computational complexity.

According to a first aspect, a method for wireless backhaul inter-node communication between a first backhaul node and a second backhaul node is provided. The method includes computing a beamforming weight matrix W; and the first backhaul node using the beamforming weight matrix W to transmit and/or receive data to and/or from the second backhaul node. The beamforming matrix W is computed as the inverse of a weighted channel estimate matrix $\check{H}=\rho \cdot \hat{H}$, such that $W=\check{H}^{-1}=(\rho \cdot \hat{H})$, where $\hat{H}$ is a channel estimate matrix and ρ is a weighting factor matrix such that $$\rho = \begin{pmatrix} 1 & \rho & \cdots & \rho^{N_{tx}-1} \\ \vdots & \vdots & \ddots & \vdots \\ 1 & \rho & \cdots & \rho^{N_{tx}-1} \end{pmatrix}$$

where ρ has dimension Nrx by Ntx, where Nrx is the number of receive antennas and Ntx is the number of transmit antennas, where Ntx, =Nrx, and ρ is a scalar between 0 and 1, and where ○ denotes a Hadamard matrix product.

In some embodiments, the first backhaul node and second backhaul node are part of a symmetric backhaul architecture, such that each backhaul node may communicate with each other backhaul node. In other embodiments, the first backhaul node and second backhaul node are part of a ring backhaul architecture, such that each backhaul node may communicate with at most two other backhaul nodes.

In some embodiments, the first and second backhaul nodes employ antenna arrays built up from sub-arrays, and where each sub-array element is given the same weighting.

According to a second aspect, a first backhaul node for wireless backhaul inter-node communication with a second backhaul node is provided. The first backhaul node is adapted to: compute a beamforming weight matrix W; and use the beamforming weight matrix W to transmit and/or receive data to and/or from the second backhaul node. The beamforming matrix W is computed as the inverse of a weighted channel estimate matrix $\check{H}=\rho \cdot \hat{H}$, such that $W=\check{H}^{-1}=(\rho \cdot \hat{H})^{-1}$, where $\hat{H}$ is a channel estimate matrix and ρ is a weighting factor matrix such that $$\rho = \begin{pmatrix} 1 & \rho & \cdots & \rho^{N_{tx}-1} \\ \vdots & \vdots & \ddots & \vdots \\ 1 & \rho & \cdots & \rho^{N_{tx}-1} \end{pmatrix}$$

where ρ has dimension Nrx by Ntx, where Nrx is the number of receive antennas and Ntx is the number of transmit antennas, where Ntx, =Nrx, and ρ is a scalar between 0 and 1, and where ○ denotes a Hadamard matrix product.

According to a third aspect, a first backhaul node for wireless backhaul inter-node communication with a second backhaul node is provided. The first backhaul node includes a computing unit configured to compute a beamforming weight matrix W; and a transceiver unit configured to use the beamforming weight matrix W to transmit and/or receive data to and/or from the second backhaul node. The beamforming matrix W is computed as the inverse of a weighted channel estimate matrix $\breve{H}=\rho \cdot \hat{H}$, such that $W=\breve{H}^{-1}=(\rho \cdot \hat{H})^{-1}$, where $\hat{H}$ is a channel estimate matrix and $\rho$ is a weighting factor matrix such that $$\rho = \begin{pmatrix} 1 & \rho & \cdots & \rho^{N_{tx}-1} \\ \vdots & \vdots & \ddots & \vdots \\ 1 & \rho & \cdots & \rho^{N_{tx}-1} \end{pmatrix}$$

where $\rho$ has dimension Nrx by Ntx, where Nrx is the number of receive antennas and Ntx is the number of transmit antennas, where Ntx, =Nrx, and $\rho$ is a scalar between 0 and 1, and where denotes a Hadamard matrix product.

According to a fourth aspect, a backhaul network is provided. The backhaul network includes a plurality of backhaul nodes including a first backhaul node and a second backhaul node. The first backhaul node includes a processor and instructions that when executed by the processor, cause the first backhaul node to: compute a beamforming weight matrix W; and use the beamforming weight matrix W to transmit and/or receive data to and/or from the second backhaul node The beamforming matrix W is computed as the inverse of a weighted channel estimate matrix $\breve{H}=\rho \cdot \hat{H}$, such that $W=\breve{H}^{-1}=(\rho \cdot \hat{H})^{-1}$, where $\hat{H}$ is a channel estimate matrix and $\rho$ is a weighting factor matrix such that $$\rho = \begin{pmatrix} 1 & \rho & \cdots & \rho^{N_{tx}-1} \\ \vdots & \vdots & \ddots & \vdots \\ 1 & \rho & \cdots & \rho^{N_{tx}-1} \end{pmatrix}$$

where $\rho$ has dimension Nrx by Ntx, where Nrx is the number of receive antennas and Ntx is the number of transmit antennas, where Ntx, =Nrx, and $\rho$ is a scalar between 0 and 1, and where ○ denotes a Hadamard matrix product.

According to a fifth aspect, a computer program is provided. The computer program includes instructions which, when executed on at least one processor, causes the at least one processor to carry out the method according to the first aspect.

According to a sixth aspect, a carrier is provided. The carrier includes the computer program of the fifth aspect. The carrier is one of an electronic signal, optical signal, radio signal or computer readable storage medium.

BRIEF DESCRIPTION OF THE DRAWINGS

The accompanying drawings, which are incorporated herein and form part of the specification, illustrate various embodiments.

DETAILED DESCRIPTION

A ZF backhaul transmission scheme is now described. To explain how to obtain a very simple ZF backhaul transmission scheme, it is first assumed that N nodes (e.g., gNBs), each using a single (rank 1) data stream to communicate with the other nodes (e.g., gNBs). The nodes are assumed to be symmetrically connected. Then, N−1 orthogonal data streams may be transmitted if the nodes are mutually spatially "separated". For example, in case N=5, a total of 4 data streams are sent to and from each node. Each node must therefore provide beam weights that (i) direct the data stream to a specific UE and (ii) perform nulling towards the other nodes. In total, this requires 4 degrees of freedom for each data stream. Since there are 4 data streams for each node, 16 degrees of freedom are required in this MU-MIMO configuration. Thus, an antenna array size of 16 is needed for this setup. In case of a rank-2 transmission, i.e. doubling the amount of data streams symmetrically, should double the number of required antenna elements to at least 32. Rank-4 transmission would require an antenna array size of 64, and so on. This geometry is illustrated in FIG. 4.

Figure 4:
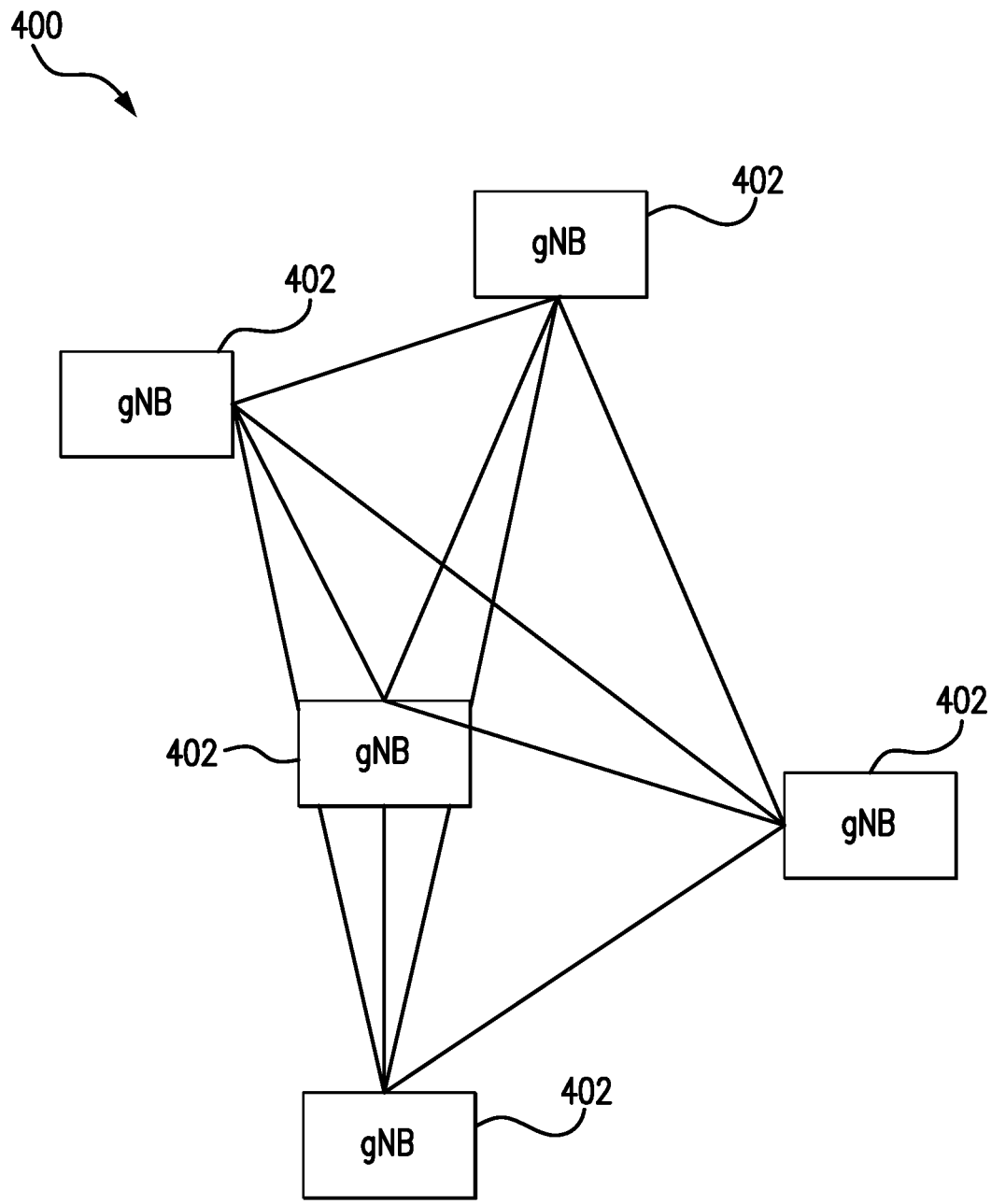
FIG. 4 illustrates a system according to one embodiment.

FIG. 4 illustrates a backhaul architecture 400 where each node 402 (e.g., base station or gNB) transmits and receives to/from every other node 402 (e.g., base station or gNB). It can be seen that for some nodes, the angular differences between interfering and selected transmission directions can be small, requiring some kind of MU-MIMO scheme.

Other backhaul architectures are possible, and the scenario shown in FIG. 4 can be generalized in various ways. For instance, there may be more or fewer nodes; or instead of a symmetric ("all send to all") architecture, there could be a ring architecture (e.g. where a node only sends or receives from two other nodes), or other types of communication restraints between nodes.

Note also that there is no significant difference between the transmission and reception in these scenarios.

Figure 1:
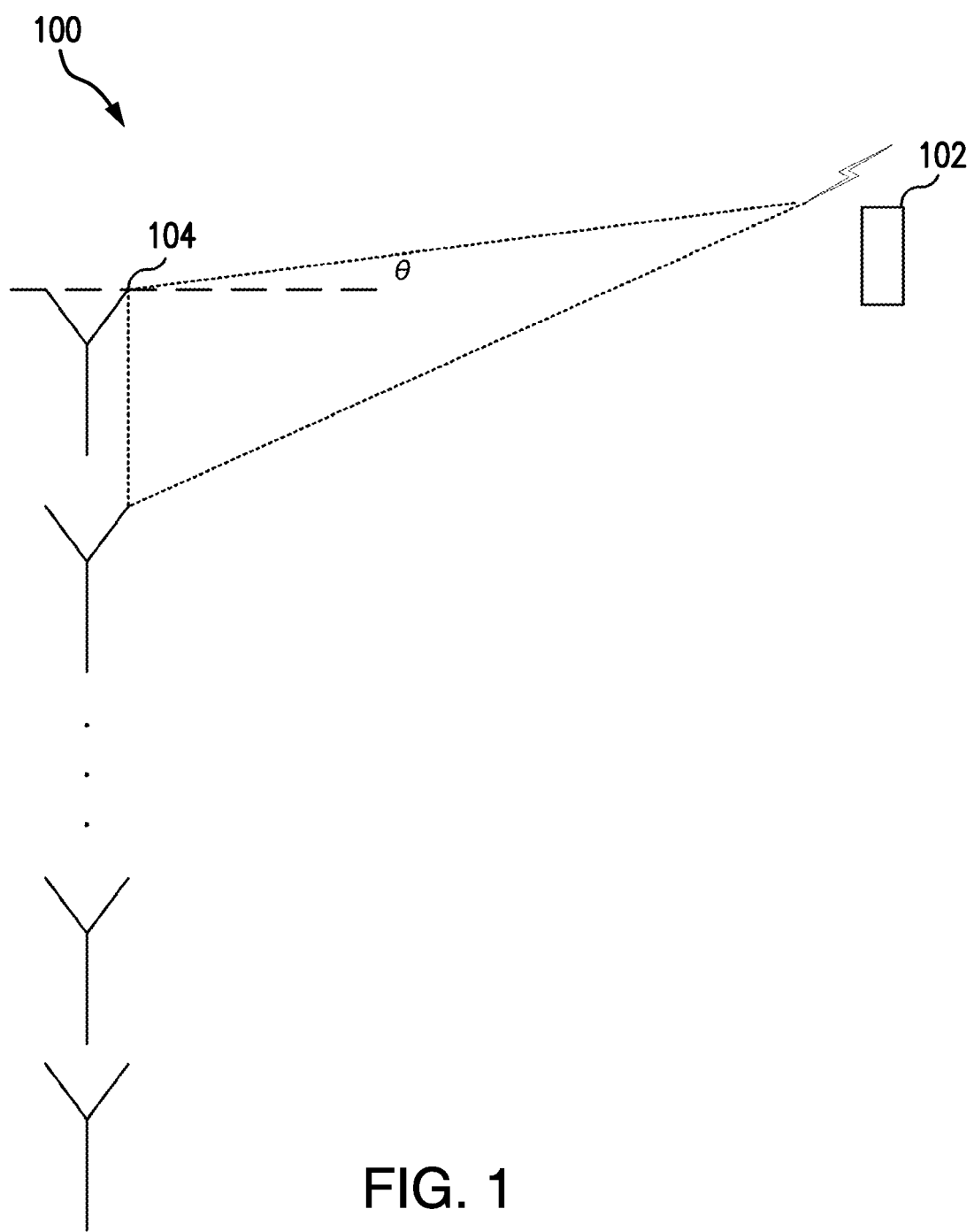
FIG. 1 illustrates a system according to one embodiment.
Figure 2A:
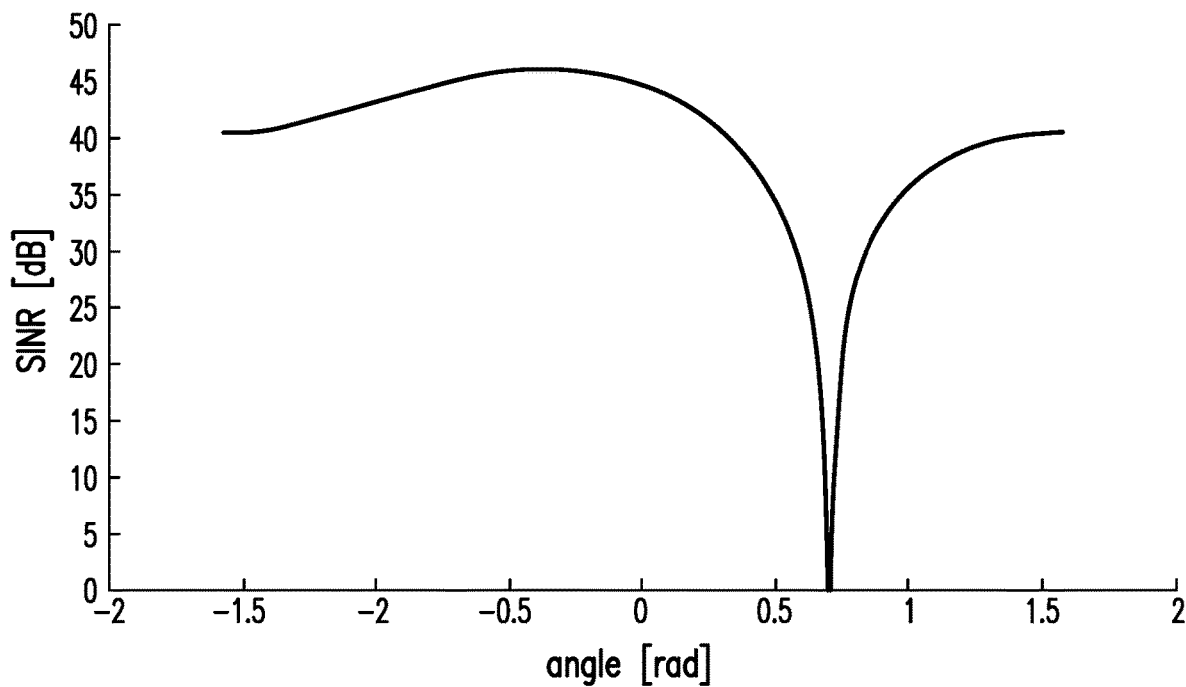
FIGS. 2A and 2B illustrate SINR plotted against angle according to a related art ZF transmission scheme.
Figure 2B:
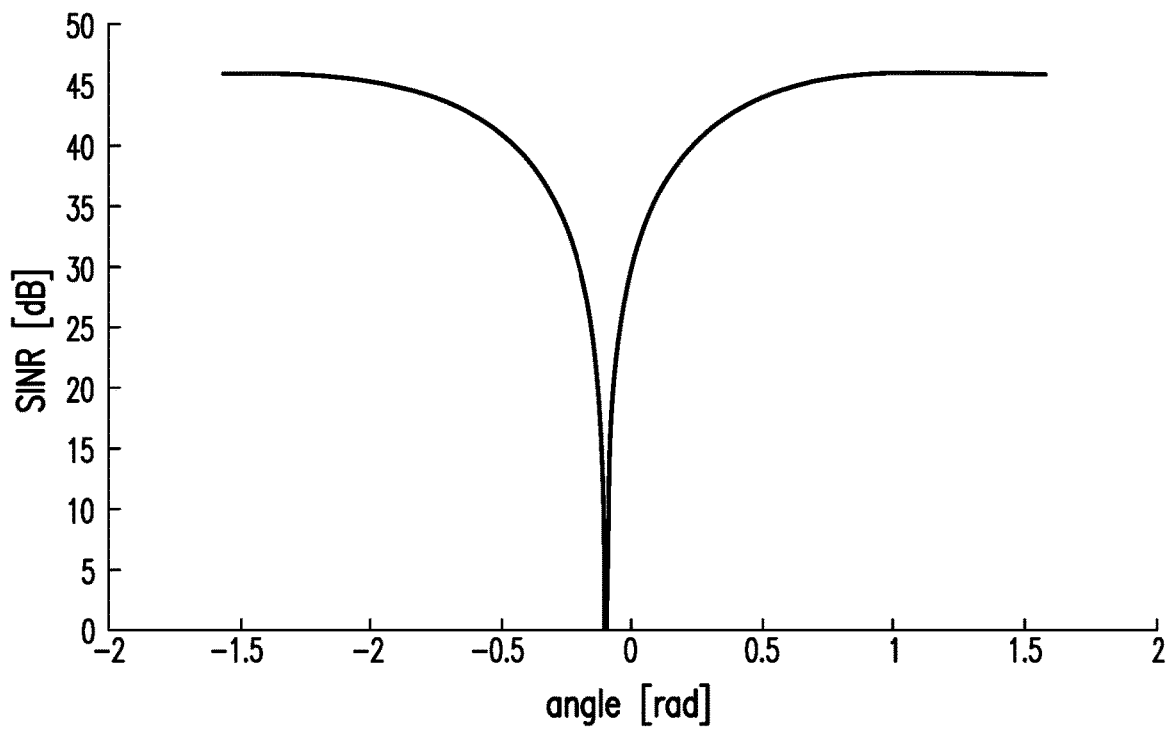
Figure 3A:
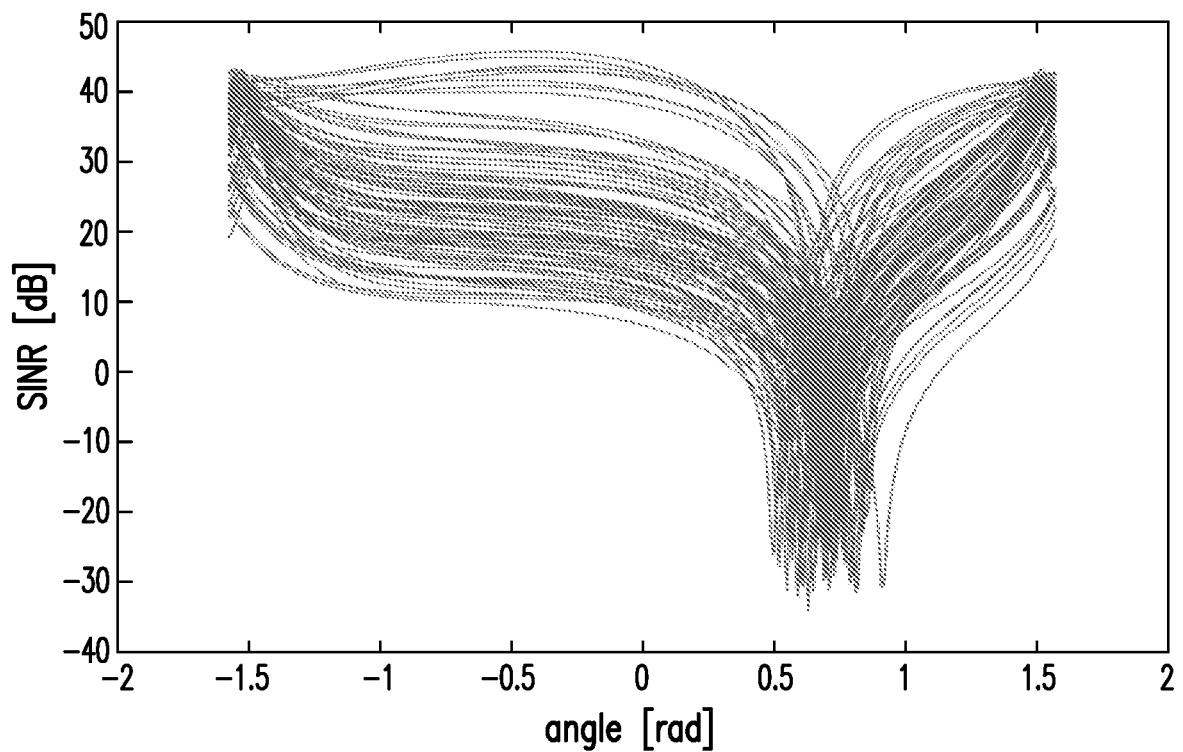
FIGS. 3A and 3B illustrate SINR plotted against angle according to a related art ZF transmission scheme.
Figure 3B:
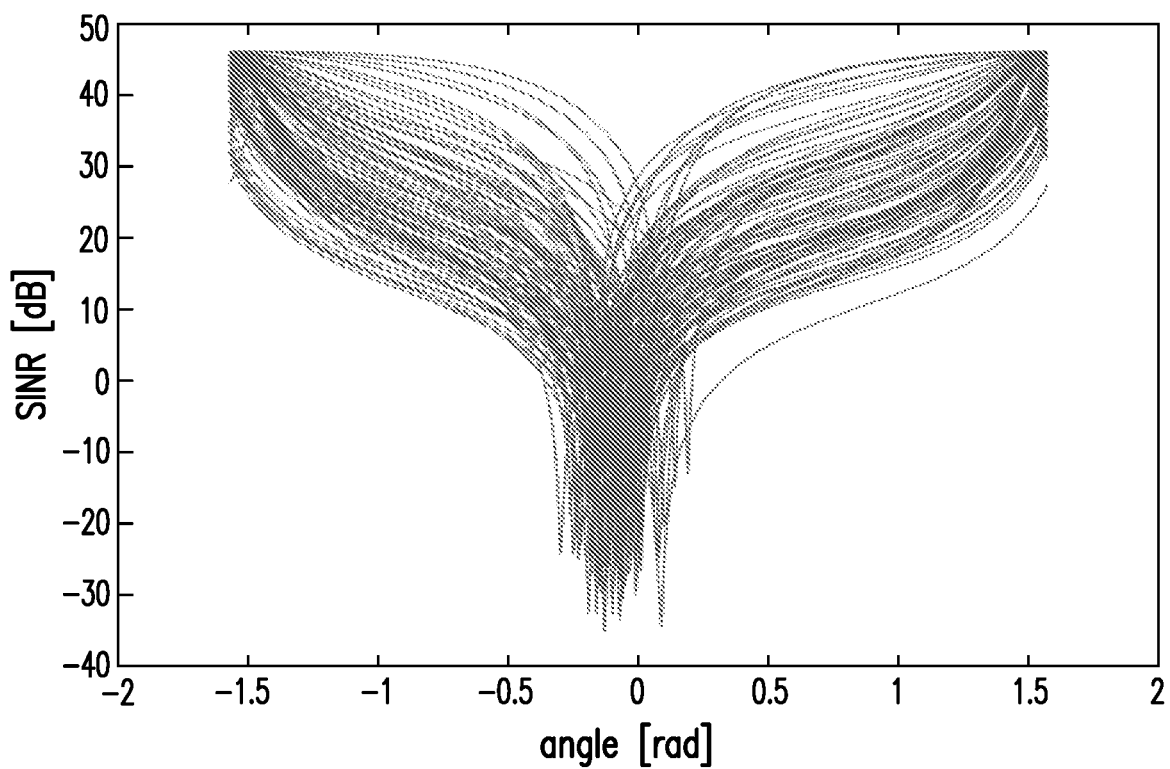

The problem of sensitivity identified above can be explained from the fact that the null-forming amounts to placing zeros on the unit circle that represents the directions to the users. Such zeros exactly on the unit circle lead to an antenna gain that is exactly 0 in exactly the estimated interfering direction. Unfortunately, the antenna gain zeros become extremely deep and narrow in the angular dimension, and therefore the zero becomes extremely sensitive to angular modeling errors like beam weight quantization errors and phase noise in transmitters and receivers. In addition, channel estimation errors in terms of the phase affects the performance. FIGS. 2-3 above each provides a very clear illustration of this fact.

Figure 5:
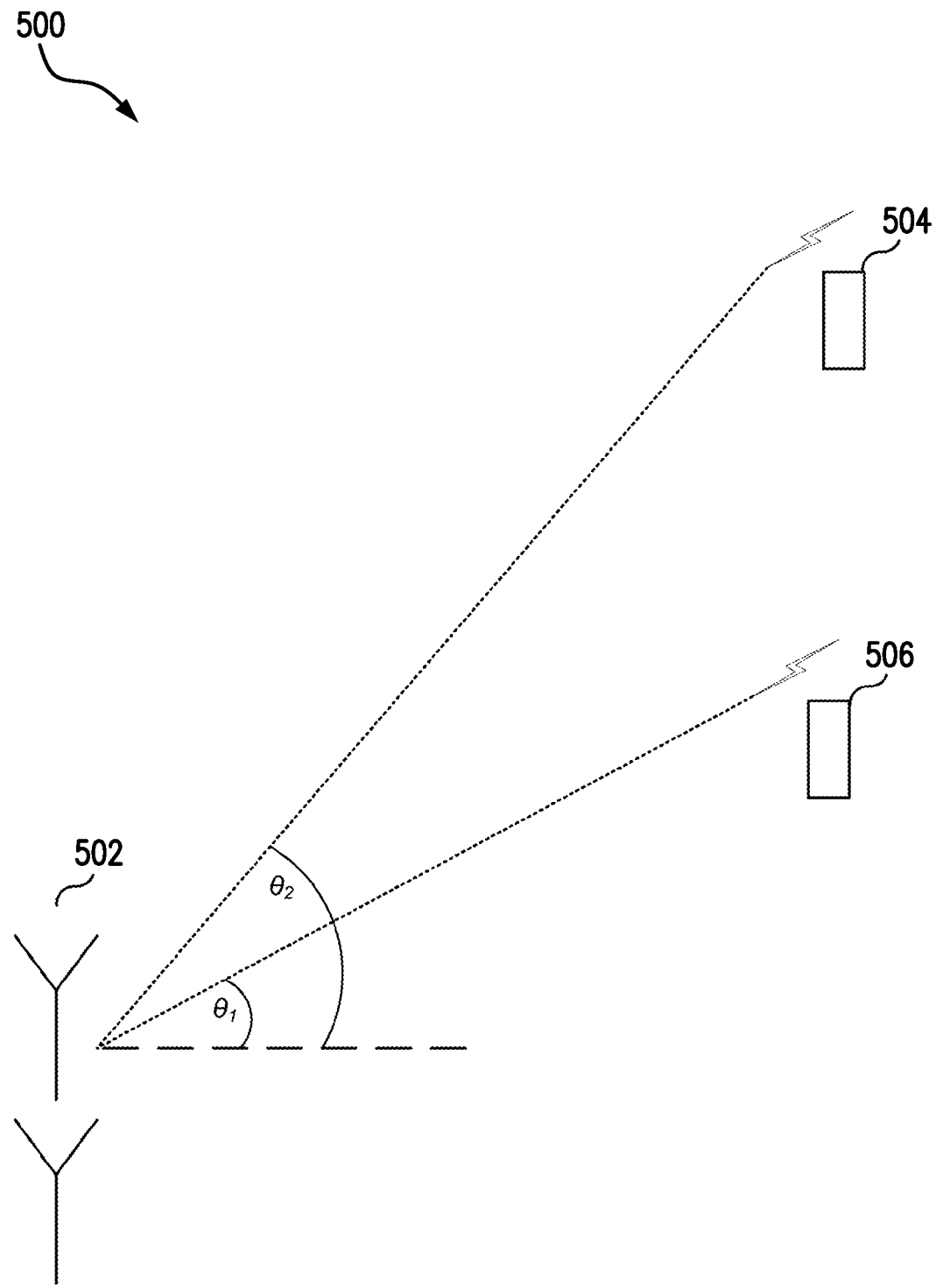
FIG. 5 illustrates a system according to one embodiment.

As an example, consider a steering vector weighting in ZF transmission, for a low order model. As shown in FIG. 5, in system 500 there are two isotropic TX antennas from node 502, and one isotropic RX antenna per nodes 504 and 506. Node 506 is located at an angle $\theta_1$ from the TX antennas at node 502, and node 504 is located at an angle $\theta_2$ from the TX antennas at node 502. Assuming isotropic antenna elements, the received signals become $$Y = \begin{pmatrix} y_1 \\ y_2 \end{pmatrix} = \begin{pmatrix} h_1 & h_1 e^{-2j\pi k \sin(\theta_1)} \\ h_2 & h_2 e^{-2j\pi k \sin(\theta_2)} \end{pmatrix} \begin{pmatrix} x_1 \\ x_2 \end{pmatrix} = \begin{pmatrix} h_1 & h_1 e^{-2j\pi k \sin(\theta_1)} \\ h_2 & h_2 e^{-2j\pi k \sin(\theta_2)} \end{pmatrix} \begin{pmatrix} w_{11} & w_{12} \\ w_{21} & w_{22} \end{pmatrix} \begin{pmatrix} s_1 \\ s_2 \end{pmatrix}.$$

Here $(y_1 \; y_2)^T$ are the received signals in nodes 502 and 504, $(x_1 \; x_2)^T$ are the precoded signals transmitted from antenna element 1 and antenna element 2, $(h_1 \; h_2)^T$ are the complex channel gains, $w_{ij}$, for i, j=1, 2, are the complex precoding weights and $(s_1 \; s_2)^T$ are the transmitted signals to nodes 504 and 506. Furthermore, k is the antenna element separation factor. All quantities above are actual ones.

First, consider a typical ZF transmission. Based on estimated channels $(\hat{h}_1 \; \hat{h}_2)^T$ the pre-coding weight are selected so that $(y_1 \; y_2)^T = (s_1 \; s_2)^T$. This means selecting $$\begin{pmatrix} \hat{h}_1 & \hat{h}_1 e^{-2j\pi k \sin(\hat{\theta}_1)} \\ \hat{h}_2 & \hat{h}_2 e^{-2j\pi k \sin(\hat{\theta}_2)} \end{pmatrix} \begin{pmatrix} w_{11} & w_{12} \\ w_{21} & w_{22} \end{pmatrix} \begin{pmatrix} s_1 \\ s_2 \end{pmatrix} = \begin{pmatrix} 1 & 0 \\ 0 & 1 \end{pmatrix}.$$

This then gives $$\begin{pmatrix} w_{11} & w_{12} \\ w_{21} & w_{22} \end{pmatrix} = \begin{pmatrix} \dfrac{1}{\hat{h}_1 \left(1 - e^{2j\pi k(\sin(\hat{\theta}_2) - \sin(\hat{\theta}_1))}\right)} & -\dfrac{e^{2j\pi k(\sin(\hat{\theta}_2) - \sin(\hat{\theta}_1))}}{\hat{h}_2 \left(1 - e^{2j\pi k(\sin(\hat{\theta}_2) - \sin(\hat{\theta}_1))}\right)} \\ -\dfrac{e^{2j\pi k \sin(\hat{\theta}_2)}}{\hat{h}_1 \left(1 - e^{2j\pi k(\sin(\hat{\theta}_2) - \sin(\hat{\theta}_1))}\right)} & \dfrac{e^{2j\pi k \sin(\hat{\theta}_2)}}{\hat{h}_2 \left(1 - e^{2j\pi k(\sin(\hat{\theta}_2) - \sin(\hat{\theta}_1))}\right)} \end{pmatrix}.$$

Then the received signals are computed as $$y_1 = h_1(w_{11}s_1 + w_{12}s_2) + h_1 e^{-2j\pi k \sin(\theta_1)}(w_{21}s_1 + w_{22}s_2)$$

$$= \frac{h_1}{\hat{h}_1}\left(\frac{1 - e^{2j\pi k(\sin(\hat{\theta}_2) - \sin(\theta_1))}}{1 - e^{2j\pi k(\sin(\hat{\theta}_2) - \sin(\hat{\theta}_1))}}\right)s_1$$

$$+ \frac{h_1}{\hat{h}_2}\left(\frac{e^{2j\pi k \sin(\hat{\theta}_2)}\left(e^{-2j\pi k \sin(\theta_1)} - e^{-2j\pi k \sin(\hat{\theta}_1)}\right)}{1 - e^{2j\pi k(\sin(\hat{\theta}_2) - \sin(\hat{\theta}_1))}}\right)s_2$$

and $$y_2 = h_2(w_{11}s_1 + w_{12}s_2) + h_2 e^{-2j\pi k \sin(\theta_2)}(w_{21}s_1 + w_{22}s_2)$$

$$= \frac{h_2}{\hat{h}_2}\left(\frac{e^{2j\pi k(\sin(\hat{\theta}_2) - \sin(\theta_2))} - e^{2j\pi k(\sin(\hat{\theta}_2) - \sin(\hat{\theta}_1))}}{1 - e^{2j\pi k(\sin(\hat{\theta}_2) - \sin(\hat{\theta}_1))}}\right)s_2$$

$$+ \frac{h_2}{\hat{h}_1}\left(\frac{1 - e^{2j\pi k(\sin(\hat{\theta}_2) - \sin(\theta_2))}}{1 - e^{2j\pi k(\sin(\hat{\theta}_2) - \sin(\hat{\theta}_1))}}\right)s_1$$

In case of perfect channel estimates the result is, as expected, $$y_1 = s_1$$

$$y_2 = s_2$$

As stated above, the above result is not robust to modeling errors.

A weighted ZF transmission is now considered. Assume that the beamforming equation is changed to $$\begin{pmatrix} \hat{h}_1 & \rho \hat{h}_1 e^{-2j\pi k \sin(\hat{\theta}_1)} \\ \hat{h}_2 & \rho \hat{h}_2 e^{-2j\pi k \sin(\hat{\theta}_2)} \end{pmatrix} \begin{pmatrix} w_{11} & w_{12} \\ w_{21} & w_{22} \end{pmatrix} = \begin{pmatrix} 1 & 0 \\ 0 & 1 \end{pmatrix}.$$

where $0 < \rho < 1$.

The steering vector is hence modified by the weighting factor $\rho$. The beamforming equation then gives:

$$\begin{pmatrix} w_{11} & w_{12} \\ w_{21} & w_{22} \end{pmatrix} = \begin{pmatrix} \dfrac{1}{\hat{h}_1\left(1 - e^{j\pi k(\sin(\hat{\theta}_2) - \sin(\hat{\theta}_1))}\right)} & -\dfrac{e^{2j\pi k(\sin(\hat{\theta}_2) - \sin(\hat{\theta}_1))}}{\hat{h}_2\left(1 - e^{2j\pi k(\sin(\hat{\theta}_2) - \sin(\hat{\theta}_1))}\right)} \\ -\dfrac{e^{2j\pi k \sin(\hat{\theta}_2)}}{\hat{h}_1\left(1 - e^{2j\pi k(\sin(\hat{\theta}_2) - \sin(\hat{\theta}_1))}\right)} & \dfrac{e^{2j\pi k \sin(\hat{\theta}_2)}}{\hat{h}_2\left(1 - e^{2j\pi k(\sin(\hat{\theta}_2) - \sin(\hat{\theta}_1))}\right)} \end{pmatrix}$$

The received signals then become $$y_1 = h_1(w_{11}s_1 + w_{12}s_2) + h_1 e^{-2j\pi k \sin(\theta_1)}(w_{21}s_1 + w_{22}s_2)$$

$$= \frac{h_1}{\hat{h}_1}\left(\frac{1 - e^{2j\pi k(\sin(\hat{\theta}_2) - \sin(\theta_1))}}{1 - e^{2j\pi k(\sin(\hat{\theta}_2) - \sin(\hat{\theta}_1))}}\right)s_1$$

$$+ \frac{h_1}{\hat{h}_2}\left(\frac{e^{2j\pi k \sin(\hat{\theta}_2)}\left(e^{-2j\pi k \sin(\theta_1)} - e^{-2j\pi k \sin(\hat{\theta}_1)}\right)}{1 - e^{2j\pi k(\sin(\hat{\theta}_2) - \sin(\hat{\theta}_1))}}\right)s_2$$

and $$y_2 = h_2(w_{11}s_1 + w_{12}s_2) + h_2 e^{-2j\pi k \sin(\theta_2)}(w_{21}s_1 + w_{22}s_2)$$

$$= \frac{h_2}{\hat{h}_2}\left(\frac{e^{2j\pi k(\sin(\hat{\theta}_2) - \sin(\theta_2))} - e^{2j\pi k(\sin(\hat{\theta}_2) - \sin(\hat{\theta}_1))}}{1 - e^{2j\pi k(\sin(\hat{\theta}_2) - \sin(\hat{\theta}_1))}}\right)s_2$$

$$+ \frac{h_2}{\hat{h}_1}\left(\frac{1 - \rho^{-1}e^{2j\pi k(\sin(\hat{\theta}_2) - \sin(\theta_2))}}{1 - e^{2j\pi k(\sin(\hat{\theta}_2) - \sin(\hat{\theta}_1))}}\right)s_1$$

This weighting affects the zeros of the original antenna pattern. The zeros are moved from a location on the unit circle, to positions at a distance of $\rho$ and $\rho^{-1}$, as intended. Note that the situation appears to be symmetric. This means that the important thing is to move the zeros away from the unit circle, inwards or outwards. When the antenna diagram is evaluated around the unit circle, there will always be a positive distance to the zeros of the transmission scheme.

To illustrate the effect of this move of zeros inward from the unit circle, the SIR is computed as follows $$SIR_1 = \frac{\hat{h}_2}{\hat{h}_1}\frac{\left(1 - \rho^{-1}e^{j2\pi k(\sin(\hat{\theta}_2) - \sin(\hat{\theta}_1))}\right)}{e^{j2\pi k \sin(\hat{\theta}_2)}\left(\rho^{-1}e^{-j2\pi k \sin(\theta_1)} - e^{-j2\pi k \sin(\hat{\theta}_1)}\right)},$$

and $$SIR_2 = \frac{\hat{h}_1}{\hat{h}_2}\frac{e^{j2\pi k \sin(\hat{\theta}_2)}\left(\rho^{-1}e^{-j2\pi k \sin(\hat{\theta}_2)} - e^{-j2\pi k \sin(\theta_1)}\right)}{\left(1 - \rho^{-1}e^{-j2\pi k(\sin(\hat{\theta}_2) - \sin(\hat{\theta}_2))}\right)}.$$

Figure 6A:
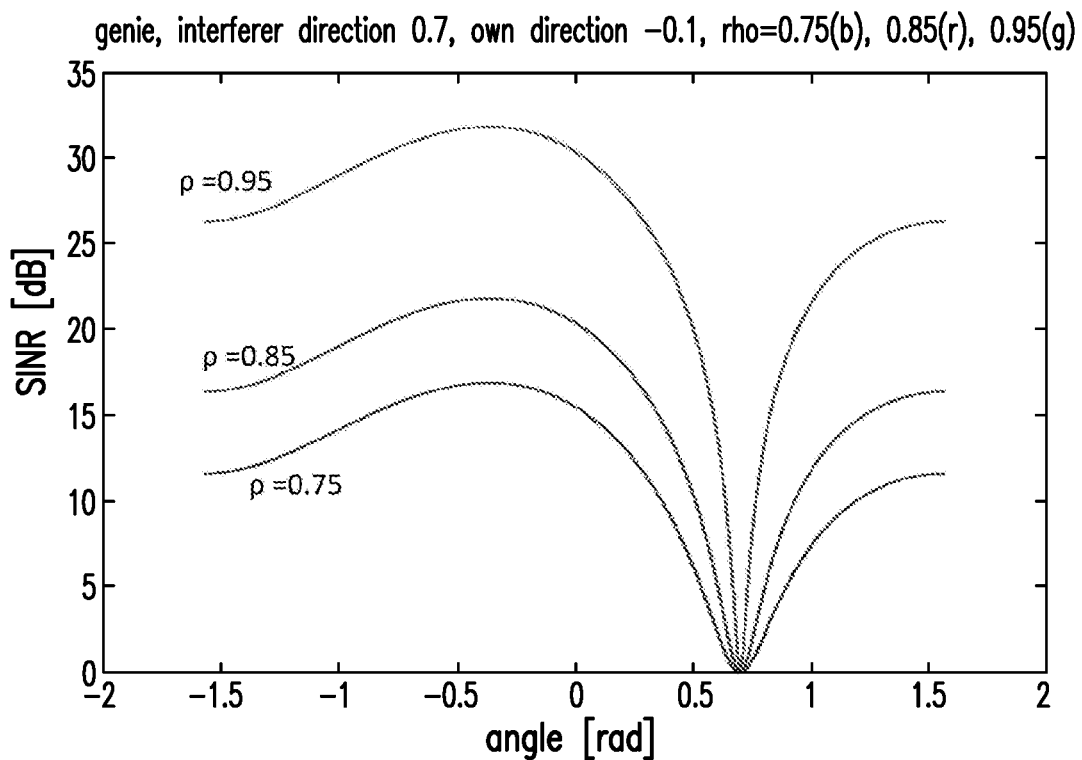
FIGS. 6A and 6B illustrate SINR plotted against angle according to one embodiment.
Figure 6B:
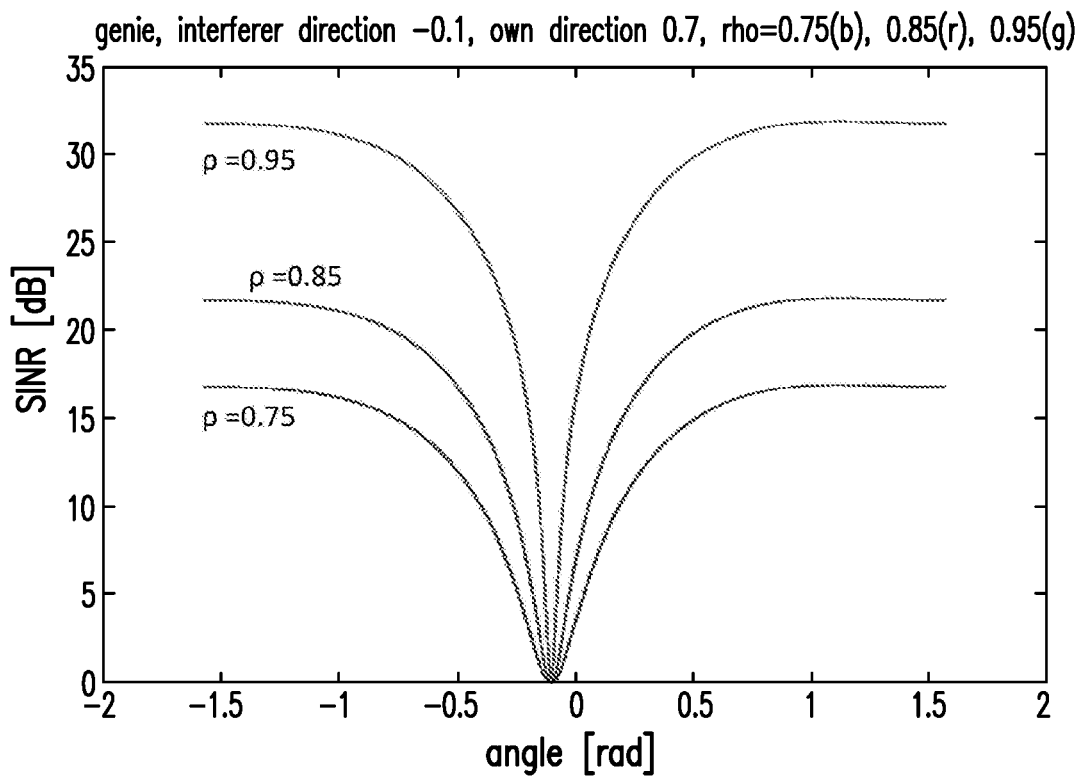
Figure 7A:
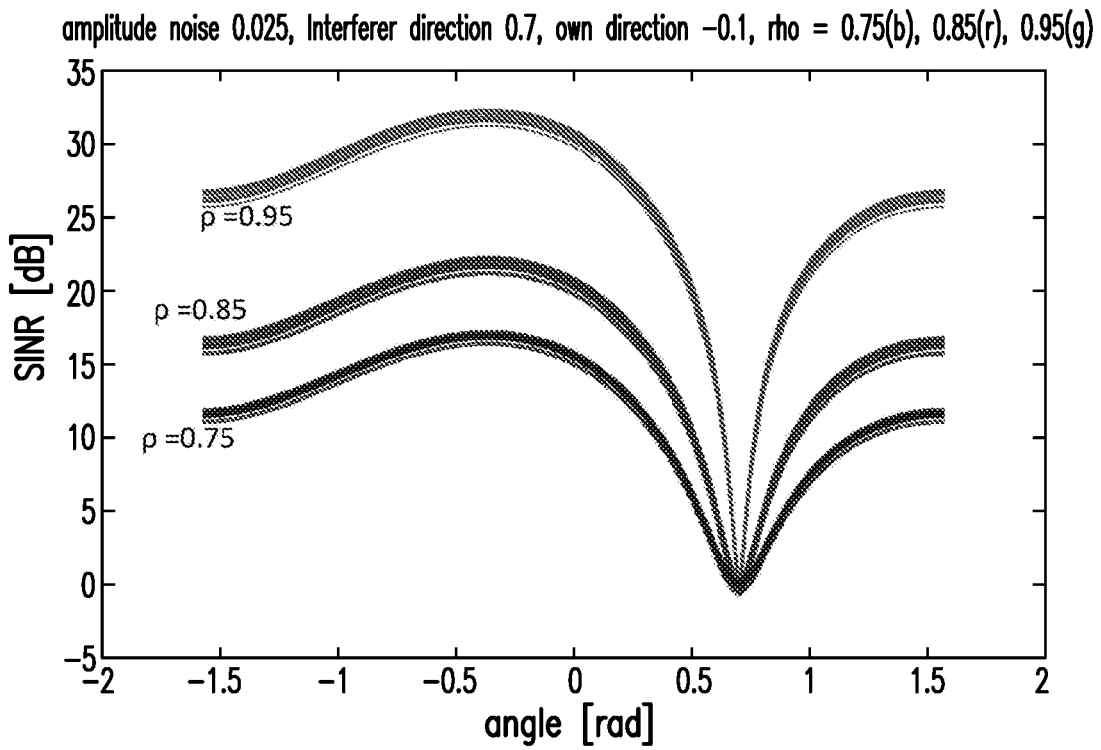
FIGS. 7A and 7B illustrate SINR plotted against angle according to one embodiment.
Figure 7B:
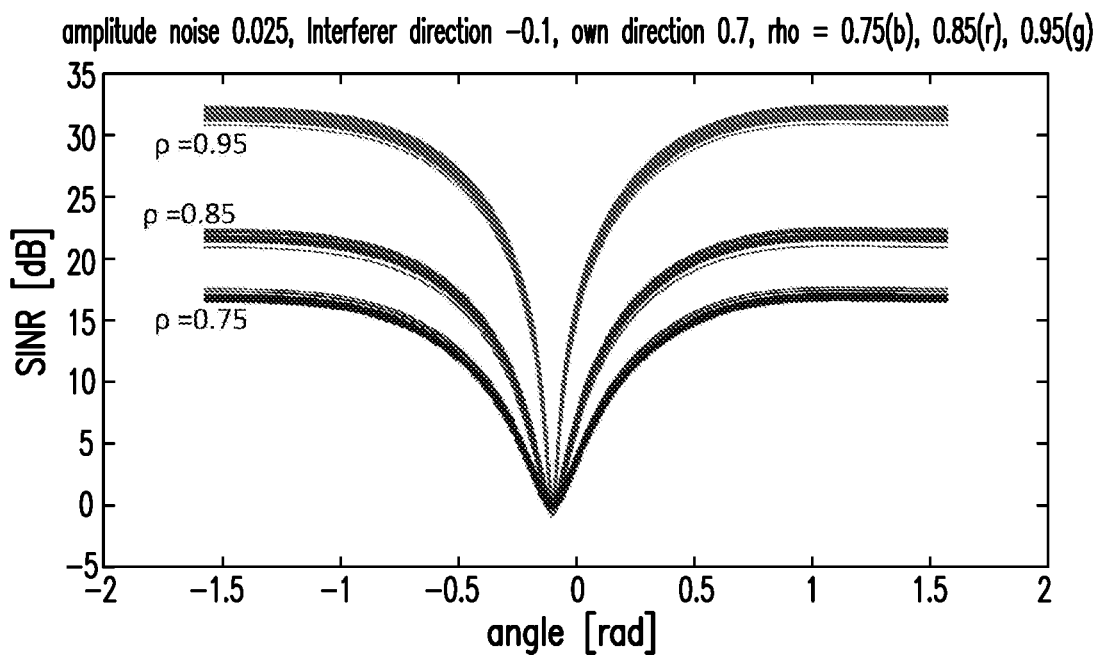

A MATLAB implementation using $h_1 = h_2 = 1$, $\theta_1 = -0.1$ and $\theta_2 = 0.3$ results in the angular variation of the SINR shown in FIGS. 6A and 6B, in the case with perfect channel estimation, for various values of ρ (specifically, ρ=0.75, 0.85, and 0.95). The effect of errors affecting the gain of the channel is depicted in FIGS. 7A and 7B, showing the same conditions as FIGS. 6A and 6B but with a 0.025 Gaussian complex gain channel estimation error. As can be seen, the impact is small, on the order of 1 dB. In contrast to the sensitivity seen above, these results are acceptable and indicate much less sensitivity to phase noise.

Figure 8A:
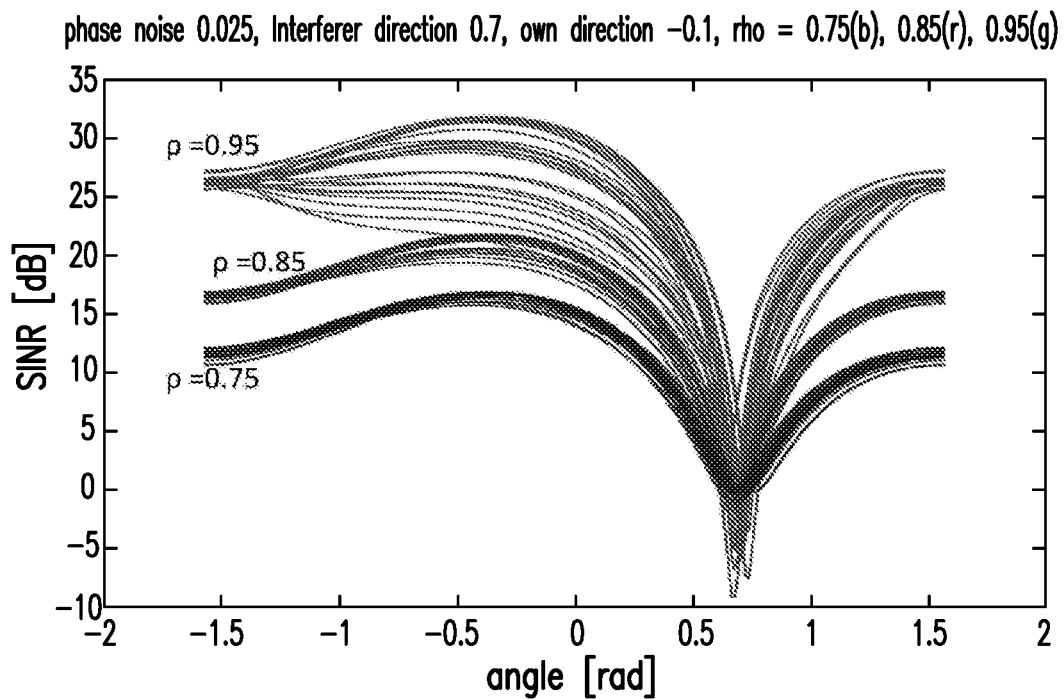
FIGS. 8A and 8B illustrate SINR plotted against angle according to one embodiment.
Figure 8B:
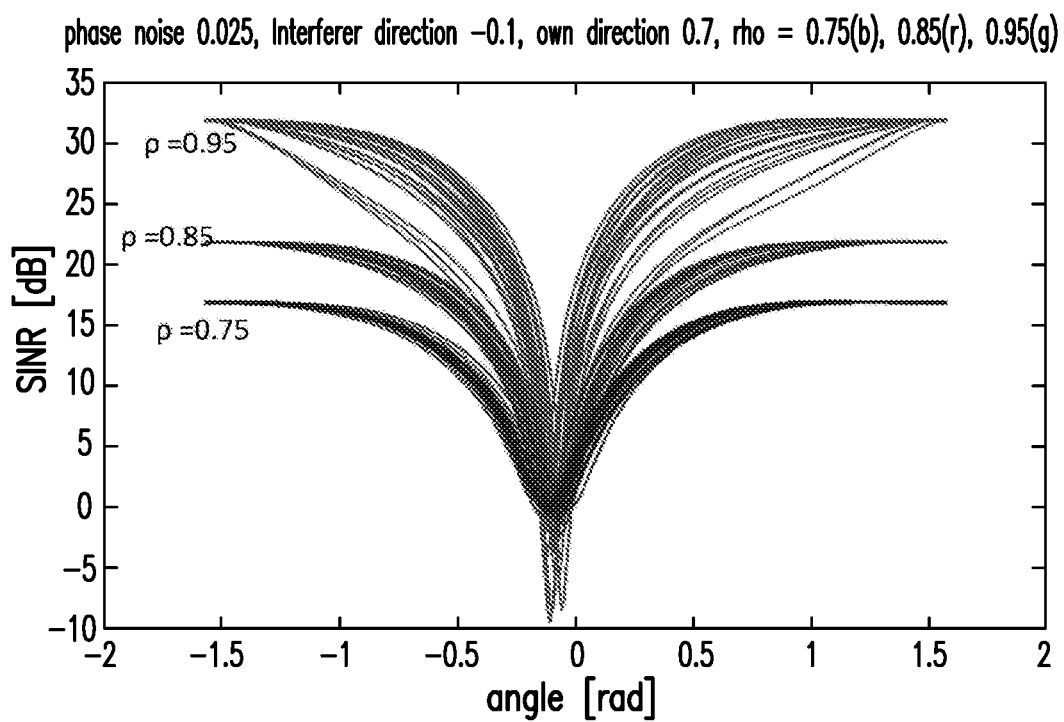

The effect of 0.025 phase noise, corresponding to the rather small angle 1.5 degrees 1-sigma, was also evaluated. The result appears in FIGS. 8A and 8B. It can be seen that the value of ρ closest to 1 results in SIR variations of more than 10 dB, making the situation unstable for the rest of the link adaptation loop. As a result performance is reduced. However, the lower values of ρ appears to be much more robust to phase noise, as expected.

Given the above low-order example, a general way to do the steering vector weighting to broaden the nulls of a general antenna diagram is now described. Towards this end, it is again noted that the presence of zeros on the unit circle means that the precoder matrix coefficients, viewed as a spatial polynomial, also has zeros on the unit circle. This in turn is because the channel matrix coefficients have zeros on the unit circle. The idea is now to use a modified channel matrix so that the zeros are moved inside the unit circle, to another circle with radius less than one. This secures that there is always a final distance in the complex plane from the unit circle to the zero which prevents an exactly zero antenna gain corresponding to the zero.

The following weighting of the steering vector is introduced:

$$\rho = \begin{pmatrix} 1 & \rho & \cdots & \rho^{N_{tx}-1} \\ \vdots & \vdots & \ddots & \vdots \\ 1 & \rho & \cdots & \rho^{N_{tx}-1} \end{pmatrix}$$

This matrix has dimension Nrx×NTx, where Nrx=Ntx is the number of antenna elements used by the transmission scheme. The weighting factor ρ typically meets |ρ|<1. The weighted channel matrix is then $$\check{H} = \rho \cdot \hat{H}$$

where ○ denotes the Hadamard matrix product, here in its simplest form expressing elementwise matrix multiplication.

The main idea is to use the weighted channel matrix instead of H in the computation of the beam forming matrix W in the beam weight calculation, i.e to compute $$W = \check{H}^{-1} = (\rho \cdot \hat{H})^{-1}$$

Note that since the multiplication is a Hadamard multiplication operator, there are no immediate issues with the fact that ρ itself is a rank 1 matrix.

It is important to note that the above scheme is readily generalized to antenna arrays built up from sub-arrays. The generalization then amounts to the handling of each sub-array as one antenna element in the description below. Each subarray element shall then be given the same weighting. This allows a direct application of embodiments to so-called constrained digital beamforming, the technology that is used in the new mmw radio ASICS for 5G. This aspect may be accounted for, e.g. by generalizing to a weighting of a virtual steering vector where virtual could mean a group of antenna elements or one single antenna element.

Figure 9:
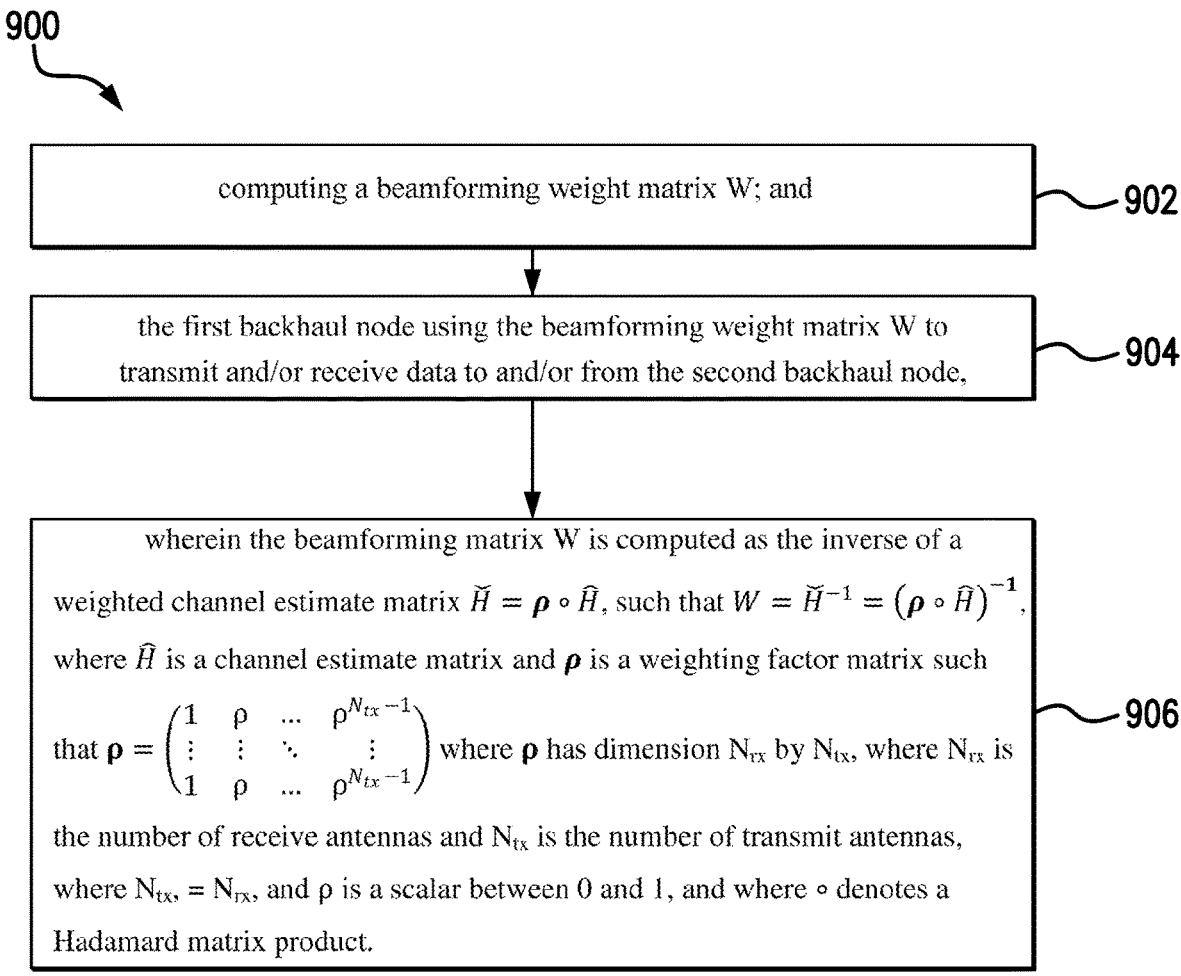
FIG. 9 is a flow chart illustrating a process according to one embodiment.

FIG. 9 illustrates a process 900. The process is a method for wireless backhaul inter-node communication between a first backhaul node and a second backhaul node. The method includes computing a beamforming weight matrix W (step 902); and the first backhaul node using the beamforming weight matrix W to transmit and/or receive data to and/or from the second backhaul node (step 904). The beamforming matrix W is computed as the inverse of a weighted channel estimate matrix $\check{H} = \rho \cdot \hat{H}$, such that $W = \check{H}^{-1} = (\rho \cdot \hat{H})^{-1}$, where $\hat{H}$ is a channel estimate matrix and ρ is a weighting factor matrix such that $$\rho = \begin{pmatrix} 1 & \rho & \cdots & \rho^{N_{tx}-1} \\ \vdots & \vdots & \ddots & \vdots \\ 1 & \rho & \cdots & \rho^{N_{tx}-1} \end{pmatrix}$$

where ρ has dimension Nrx by Ntx, where Nrx is the number of receive antennas and Ntx is the number of transmit antennas, where Ntx, =Nrx, and ρ is a scalar between 0 and 1, and where denotes a Hadamard matrix product (step 906).

In some embodiments, the first backhaul node and second backhaul node are part of a symmetric backhaul architecture, such that each backhaul node may communicate with each other backhaul node. In other embodiments, the first backhaul node and second backhaul node are part of a ring backhaul architecture, such that each backhaul node may communicate with at most two other backhaul nodes.

In some embodiments, the first and second backhaul nodes employ antenna arrays built up from sub-arrays, and where each sub-array element is given the same weighting.

Figure 10:
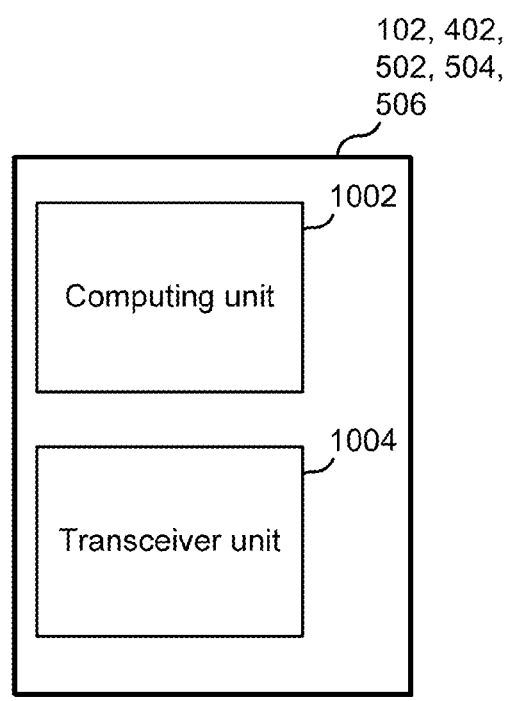
FIG. 10 is a diagram showing functional units of a node according to one embodiment.

FIG. 10 is a diagram showing functional units of a node such as nodes 102, 402, 502, 504, 506, according to some embodiments. The node includes one or more of a computing unit 1002 and a transceiver unit 1004. The node may be a first backhaul node for wireless backhaul inter-node communication with a second backhaul node.

The computing unit 1002 is configured to compute a beamforming weight matrix W; and the transceiver unit 1004 is configured to use the beamforming weight matrix W to transmit and/or receive data to and/or from the second backhaul node. The beamforming matrix W is computed as the inverse of a weighted channel estimate matrix $\check{H} = \rho \cdot \hat{H}$, such that $W = \check{H}^{-1} = (\rho \cdot \hat{H})^{-1}$, where $\hat{H}$ is a channel estimate matrix and ρ is a weighting factor matrix such that $$\rho = \begin{pmatrix} 1 & \rho & \cdots & \rho^{N_{tx}-1} \\ \vdots & \vdots & \ddots & \vdots \\ 1 & \rho & \cdots & \rho^{N_{tx}-1} \end{pmatrix}$$

where ρ has dimension Nrx by Ntx, where Nrx is the number of receive antennas and Ntx is the number of transmit antennas, where Ntx, =Nrx, and ρ is a scalar between 0 and 1, and where ○ denotes a Hadamard matrix product.

In some embodiments, a backhaul network is provided, the backhaul network including a plurality of backhaul nodes including a first backhaul node and a second backhaul node. The first and/or second backhaul node may be configured to perform process 900 described above.

Figure 11:
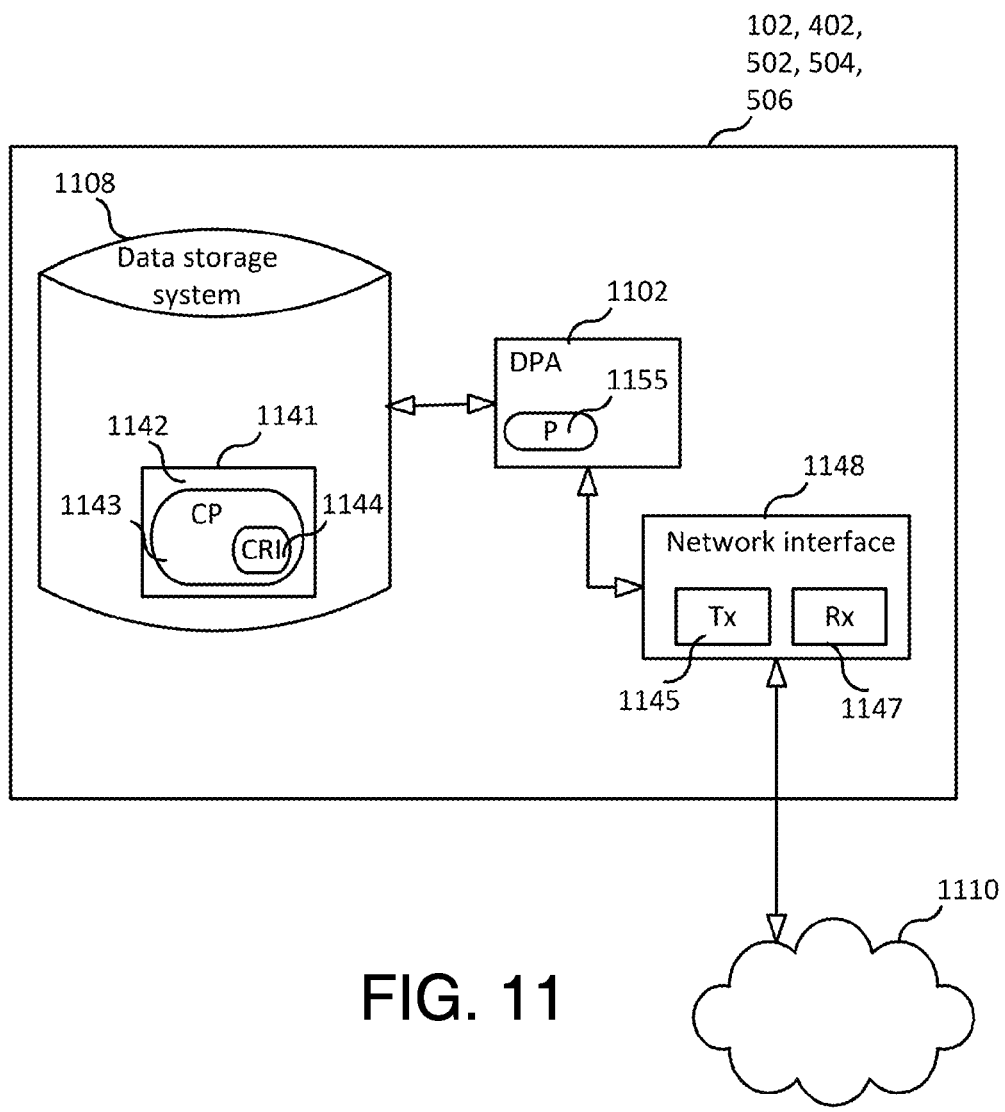
FIG. 11 is a block diagram of a node according to one embodiment.

FIG. 11 is a block diagram of a node such as nodes 102, 402, 502, 504, 506, according to some embodiments. As shown in FIG. 11, the node may comprise: processing circuitry (PC) 1102, which may include one or more processors (P) 1155 (e.g., a general purpose microprocessor and/or one or more other processors, such as an application specific integrated circuit (ASIC), field-programmable gate arrays (FPGAs), and the like); a network interface 1148 comprising a transmitter (Tx) 1145 and a receiver (Rx) 1147 for enabling the node to transmit data to and receive data from other nodes connected to a network 1110 (e.g., an Internet Protocol (IP) network) to which network interface 1148 is connected; and a local storage unit (a.k.a., "data storage system") 1108, which may include one or more non-volatile storage devices and/or one or more volatile storage devices. In embodiments where PC 1102 includes a programmable processor, a computer program product (CPP) 1141 may be provided. CPP 1141 includes a computer readable medium (CRM) 1142 storing a computer program (CP) 1143 comprising computer readable instructions (CRI) 1144. CRM 1142 may be a non-transitory computer readable medium, such as, magnetic media (e.g., a hard disk), optical media, memory devices (e.g., random access memory, flash memory), and the like. In some embodiments, the CRI 1144 of computer program 1143 is configured such that when executed by PC 1102, the CRI causes the node to perform steps described herein (e.g., steps described herein with reference to the flow charts). In other embodiments, the node may be configured to perform steps described herein without the need for code. That is, for example, PC 1102 may consist merely of one or more ASICs. Hence, the features of the embodiments described herein may be implemented in hardware and/or software.

While various embodiments of the present disclosure are described herein, it should be understood that they have been presented by way of example only, and not limitation. Thus, the breadth and scope of the present disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method for wireless backhaul inter-node communication between a first backhaul node and a second backhaul node, the method comprising:
   computing a beamforming weight matrix W; and
   the first backhaul node using the beamforming weight matrix W to transmit data to the second backhaul node and/or receive data from the second backhaul node,
   wherein the beamforming matrix W is computed as the inverse of a weighted channel estimate matrix $\breve{H} = \rho \cdot \hat{H}$, such that $W = \breve{H}^{-1} = (\rho \cdot \hat{H})^{-1}$, where $\hat{H}$ is a channel estimate matrix and $\rho$ is a weighting factor matrix such that $$\rho = \begin{pmatrix} 1 & \rho & \cdots & \rho^{N_{tx}-1} \\ \vdots & \vdots & \ddots & \vdots \\ 1 & \rho & \cdots & \rho^{N_{tx}-1} \end{pmatrix}$$

where $\rho$ has dimension $N_{rx}$ by $N_{tx}$, where $N_{rx}$ is the number of receive antennas and $N_{tx}$ is the number of transmit antennas, where $N_{tx} = N_{rx}$, and $0 < \rho < 1$, and where $\circ$ denotes a Hadamard matrix product.

2. The method according to claim 1, wherein the first backhaul node and second backhaul node are part of a symmetric backhaul architecture, such that each backhaul node may communicate with each other backhaul node.

3. The method according to claim 1, wherein the first backhaul node and second backhaul node are part of a ring backhaul architecture, such that each backhaul node may communicate with at most two other backhaul nodes.

4. The method according to claim 1, wherein the first and second backhaul nodes employ antenna arrays built up from sub-arrays, and where each sub-array element is given the same weighting.

5. A computer program product comprising a non-transitory computer readable medium storing a computer program comprising instructions which, when executed on at least one processor, causes the at least one processor to carry out the method of claim 1.

6. A first backhaul node for wireless backhaul inter-node communication with a second backhaul node, the first backhaul node comprising:
   a computing unit configured to compute a beamforming weight matrix W; and
   a transceiver unit configured to use the beamforming weight matrix W to transmit data to the second backhaul node and/or receive data from the second backhaul node,
   wherein the beamforming matrix W is computed as the inverse of a weighted channel estimate matrix $\breve{H} = \rho \cdot \hat{H}$, such that $W = \breve{H}^{-1} = (\rho \cdot \hat{H})^{-1}$, where $\hat{H}$ is a channel estimate matrix and $\rho$ is a weighting factor matrix such that $$\rho = \begin{pmatrix} 1 & \rho & \cdots & \rho^{N_{tx}-1} \\ \vdots & \vdots & \ddots & \vdots \\ 1 & \rho & \cdots & \rho^{N_{tx}-1} \end{pmatrix}$$

where $\rho$ has dimension $N_{rx}$ by $N_{tx}$, where $N_{rx}$ is the number of receive antennas and $N_{tx}$ is the number of transmit antennas, where $N_{tx} = N_{rx}$, and $0 < \rho < 1$, and where $\circ$ denotes a Hadamard matrix product.

7. A backhaul network comprising:
   a plurality of backhaul nodes including a first backhaul node and a second backhaul node;
   wherein the first backhaul node includes a processor and instructions that when executed by the processor, cause the first backhaul node to:
   compute a beamforming weight matrix W; and
   use the beamforming weight matrix W to transmit data to the second backhaul node and/or receive data from the second backhaul node,
   wherein the beamforming matrix W is computed as the inverse of a weighted channel estimate matrix $\breve{H} = \rho \cdot \hat{H}$, such that $W = \breve{H}^{-1} = (\rho \cdot \hat{H})^{-1}$, where $\hat{H}$ is a channel estimate matrix and $\rho$ is a weighting factor matrix such that $$\rho = \begin{pmatrix} 1 & \rho & \cdots & \rho^{N_{tx}-1} \\ \vdots & \vdots & \ddots & \vdots \\ 1 & \rho & \cdots & \rho^{N_{tx}-1} \end{pmatrix}$$

where $\rho$ has dimension $N_{rx}$ by $N_{tx}$, where $N_{rx}$ is the number of receive antennas and $N_{tx}$ is the number of transmit antennas, where $N_{tx}=N_{rx}$, and $0<\rho<1$, and where $\circ$ denotes a Hadamard matrix product.

* * * * *